United States Patent [19]
Narayanan et al.

[11] 3,789,073
[45] Jan. 29, 1974

[54] ADAMANTYLALKYLAMINOALKYL BENZAMIDES

[75] Inventors: Venkatachala L. Narayanan, North Brunswick; Jack Bernstein, New Brunswick, both of N.J.

[73] Assignee: G. R. Squibb & Sons, Inc., New York, N.Y.

[22] Filed: Apr. 22, 1970

[21] Appl. No.: 30,976

Related U.S. Application Data

[63] Continuation-in-part of Ser. No. 670,765, Sept. 26, 1967, abandoned, which is a continuation-in-part of Ser. No. 571,399, Aug. 10, 1966, abandoned.

[52] U.S. Cl. ...... 260/558 A, 260/559 A, 260/565 P, 424/324
[51] Int. Cl. .......................................... C07c 103/20
[58] Field of Search ............................. 260/558, 559

[56] References Cited
UNITED STATES PATENTS
3,328,251  6/1967  Smith................................ 260/563

Primary Examiner—Harry I. Moatz
Attorney, Agent, or Firm—Lawrence S. Levinson; Merle J. Smith

[57] ABSTRACT

This invention relates to new adamantylalkylaminoalkyl benzamides of the general formula

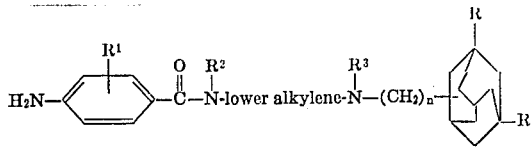

and to acid addition salts and quaternary ammonium salts of such benzamides, substances which are water softeners, inhibit corrosion, arrest cardiac arrhythmia and combat viral infection.

13 Claims, No Drawings

ADAMANTYLALKYLAMINOALKYL BENZAMIDES

This application is a continuation-in-part of application Ser. No. 670,765, filed Sept. 16, 1967 now abandoned, which is in turn a continuation-in-part of application Ser. No. 571,399, filed Aug. 10, 1966, now abandoned.

SUMMARY OF THE INVENTION

This invention relates to new chemical compounds. More particularly, it relates to new compounds of the formula (I)
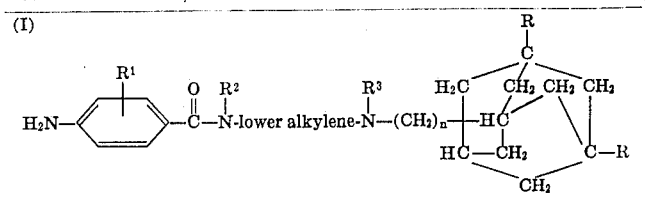

and to acid addition and quaternary ammonium salts thereof.

In Formula I, each R is hydrogen, halo, lower alkyl or lower alkoxy when the adamantyl ring is attached to the side chain by the 1-position and each R is hydrogen when the ring is attached in the 2-position, $R^1$ is hydrogen, halo, trifluoromethyl, lower alkoxy or lower alkyl, $R^2$ and $R^3$ are each hydrogen, lower alkyl, lower alkenyl or phenyl-lower alkyl and $n$ is 0 to 2.

The lower alkyl, lower alkylene, lower alkenyl and lower alkoxy groups include straight and branched chain radicals, preferably with less than four carbon atoms, especially those having two carbon atoms. The four common halogens are contemplated by the term "halo", chlorine and bromine being preferred. Benzyl and phenethyl are the preferred phenyl-lower alkyl groups. In all instances, products of Formula I are preferred wherein the adamantyl ring is attached by a bridgehead carbon. The lower alkenyl group is of a lower order of preference.

The compounds of Formula I are produced by converting a substituted aminoadamantane of the formula (II)
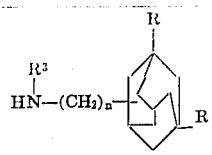

to the corresponding alkylenediamine of the formula (III)
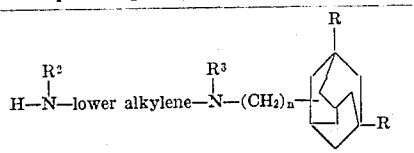

wherein $R^2$ is hydrogen by reaction with a sulfonylaziridine, such as tosylaziridine, brosylaziridine or the like (formed by treating an aziridine with tosyl chloride or the like in the presence of a base like triethylamine) and then reductively cleaving the resulting sulfonamide with sodium in liquid ammonia, lithium aluminum hydride or the like in an inert organic solvent such as ether, tetrahydrofuran, dioxane or isopropyl ether.

Compounds of Formula III in which $R^2$ is other than hydrogen may be prepared by alkylation of a sulfonamide as obtained above with an alkylating agent such as methyl iodide, allyl bromide or benzyl chloride, prior to the reductive cleavage.

Alternatively, compounds of Formula III may be prepared by treatment of an aminoadamantane of Formula II with ethylene oxide and converting the aminoethanol thus obtained to the corresponding halide and reacting this halide with a primary amine such as methyl amine, ethyl amine, allyl amine or benzyl amine.

As additional alternative procedures, the aminoadamantane of Formula II may be acylated with a haloacyl halide and the amide so obtained reduced to the corresponding amino lower alkylene halide for subsequent reaction with a primary amine.

Compounds of Formula III are then acylated with a substituted benzoyl halide (or equivalent acylating agent) e.g., with 4-nitrobenzoyl chloride, an $R^1$-substituted-4-nitrobenzoyl chloride or a mixed anhydride or a 4-nitrobenzoic acid and a lower alkyl carbonic acid (formed by the reaction of a 4-nitrobenzoic acid salt with a lower alkyl chlorocarbonate), in an inert organic solvent such as ether, dioxane, chloroform or the like to produce a coupound of the formula (IV)
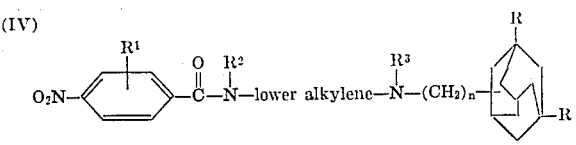

and finally reducing the nitro group to an amino group, e.g., by hydrogenation in the presence of a catalyst such as platinum oxide, or palladium or by chemical reduction, e.g., with iron, tin or stannous chloride in hydrochloric acid, ammonium sulfide or the like.

The product of the acylation reaction in which a benzoyl halide is one of the reactants is generally the hydrohalide salt, which is the form obtained after the catalytic reduction of the nitro group. This may be converted to the free base by neutralization with a base such as sodium hydroxide, and subsequently converted to other desired acid addition salts by treatment of the base in an inert solvent such as ether, dioxane or acetone with a solution of an equivalent amount of the acid in a solvent such as ether, dioxane, acetone, ethanol and the like.

The hydrohalides, e.g., hydrochlorides, hydrobromides, etc., as well as other acid addition salts, including inorganic salts such as phosphate, sulfate, nitrate and the like, and organic salts such as citrate, picrate, tartrate, salicylate, oxalate, acetate, ascorbate, succinate, methanesulfonate, benzenesulfonate, toluenesulfonate, aminobenzoate and the like, may be produced by reacting the free base with the appropriate inorganic or organic acid. The acid addition salts frequently provide a convenient means for isolating the product from the reaction mixture and for characterization purposes.

These compounds also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. They are formed by reacting the base with the alkyl halide, sulfate, etc.

Suitable starting 4-nitrobenzoic acids for conversion to a substituted 4-nitrobenzoyl halide (by reaction with thionyl chloride, thionyl bromide or phosphorous pentachloride) include 4-nitrobenzoic acid, 2-chloro-4-nitrobenzoic acid, 3-chloro-4-nitrobenzoic acid, 2-bromo-4-nitrobenzoic acid, 3-bromo-4-nitrobenzoic acid, 2-fluoro-4-nitrobenzoic acid, 2-methoxy-4-nitrobenzoic acid, 2-ethoxy-4-nitrobenzoic acid, 3-ethoxy-4-nitrobenzoic acid, 2-propoxy-4-nitrobenzoic acid, 2-methyl-4-nitrobenzoic acid, 2-trifluoromethyl-4-nitrobenzoic acid.

Suitable starting materials of Formula II wherein $R^3$ is other than hydrogen may be prepared by acylating an aminoadamantane with a lower alkanoyl halide and reducing the amine thus formed to a compound of Formula II with lithium aluminum hydride. Alternatively, an R-substituted adamantane carboxylic acid or an R-substituted adamantyl acetic acid is converted to the corresponding $R^3$-substituted amide and the amide reduced with lithium aluminum hydride. Among the adamantane acids that may be used are 1-adamantanecarboxylic acid, 3-methyl-1-adamantanecarboxylic acid, 3-methoxy-1-adamantanecarboxylic acid, 3-fluoro-1-adamantanecarboxylic acid, 3-chloro-1-adamantanecarboxylic acid, 3-bromo-1-adamantanecarboxylic acid, 3-iodo-1-adamantanecarboxylic acid, 3,5-dimethyl-1-adamantanecarboxylic acid, 1-adamantylacetic acid, the corresponding 2-adamantanecarboxylic acids and the like.

Among the aminoadamantanes of Formula II which may be used are N-methyl-1-aminoadamantane, N-ethyl-1-aminoadamantane, N-butyl-1-aminoadamantane, N-allyl-1-aminoadamantane, the corresponding N-substituted-2-aminoadamantanes and the like.

The starting materials of formula II may be obtained by a variety of methods. Fort et al., Chemical Reviews 64, 277 (1964) provides a review of the methods of synthesis of various compounds and source material. See also U.S. Pat. No. 3,218,355, Nov. 16, 1965, U.S. Pat. No. 3,310,469, Mar. 21, 1967, U.S. Pat. No. 3,328,251, June 27, 1967, and Eire Pat. No. 342/64, Oct. 23, 1964.

For example, compounds of Formula II wherein *n* is 0 or 1 may be obtained from adamantyl bromides by the method described by Gerzon et al., J. Med. Chem. 6, 760 (1963) according to the following general reaction scheme:

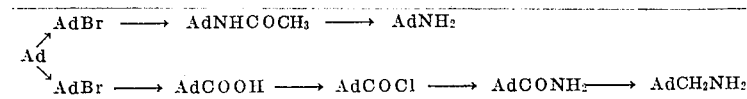

Compounds of Formula II wherein *n* is 2 may similarly be obtained from adamantyl bromides which may be converted to adamantylacetic acids by the method of Stetter et al., Chem. Ber. 92, 1629 (1963), then by the method of Gerzon et al. supra. Converting the adamantyl acetic acid to the amide followed by reduction with lithium aluminum hydride as described above to the amine, according to the following reaction scheme:

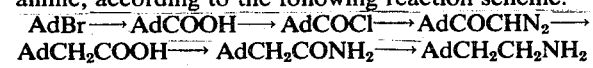

Obviously any of the intermediates indicated in the foregoing may be obtained by alternate methods described in the Fort et al. article or the sources reviewed therein.

The unsubstituted and substituted adamantanes which may be used as indicated above may be obtained by the isomerization method described by Fort et al. or by introduction of additional groups also as described in that article.

The new compounds of this invention are useful as water softeners and for inhibiting the corrosivity of engine lubricants. They are also useful as antifibrillatory agents, e.g., in arresting cardiac arrhythmia in animals, e.g., mice, cats, dogs and rats. For the latter purpose, a compound of Formula I or a physiologically acceptable acid addition or quaternary ammonium salt thereof may be incorporated in a conventional dosage form such as tablet, capsule, elixir, injectable or the like along with the necessary carrier material, excipient, lubricant, buffer or the like for oral or parenteral administration in single or divided doses of about 4 to 25 mg/kg/day, preferably about 2 to 5 mg/kg, two to four times daily ($ED_{50}=11$ mg/kg in mice). In addition, they are useful as antiviral agents in animals, e.g., against influenza virus such as A-PR8 or hepatic virus such as $MHV_3$, by oral or parenteral administration as indicated above at doses of about 10 to 30 mg/kg/day divided in four to six doses.

The following examples are illustrative of the invention. All temperatures are expressed on the centigrade scale.

EXAMPLE 1

N-[2-[N'-(1-adamantyl)-N'-ethylamino]ethyl]-p-aminobenzamide hydrochloride a. N-ethyl-1-adamantylamine To a well stirred suspension of 25 g. of lithium aluminum hydride in 1 l. of dry ether, 19.3 g. of 1-acetaminoadamantane [Stetter et al., Chem. Ber. 92, 1629 (1963)] are added in portions (addition time 4 hr.), and the mixture heated under reflux overnight. The reaction mixture is cooled to −5°, and 25 ml. of distilled water are added dropwise followed by 75 ml. of 10% NaOH solution. After the addition of 20 ml. of water, the precipitated solids are filtered and washed thoroughly with 1 l. of ether. The combined extract is dried over anhydrous magnesium sulfate, concentrated and distilled giving 14.2 g. of product, b.p. about 102—104° (7.0 mm.) which solidifies to a low melting solid.

b. N-[2-[N'-(1-adamantyl)-N'-ethylamino]ethyl]-p-toluenesulfonamide

To a mixture of 4.31 g. of ethyleneimine and 10.12 g. of triethyamine in 150 ml. of dry benzene cooled to −5°, a solution of 19.07 g. of tosyl chloride in 200 ml. of dry chloroform is added during 1 hour. After stirring for 0.5 hr. dry ether is added and the precipitated solid is removed by filtration and washed with ether. The combined extract is concentrated to a syrup at room temperature, and dissolved in 100 ml. of dry benzene. To the above solution of aziridine tosylate, a solution of 17.93 g. of N-ethyl-1-adamantylamine in 100 ml. of dry benzene is added at 20°, and the mixture is stirred overnight at 5°. The reaction mixture is allowed to warm up to room temperature, and is heated under reflux for 6 hours. Evaporation of the solvent in vacuo gives a thick syrup. Ether (500 ml.) is added, and the precipitated polymeric material is filtered. The ethereal extract is concentrated, 100 ml. of hexane are added and the mixture allowed to stand for 2 hours whereupon 10.3 g. of solid separates. After recrystallization from benzene-hexane, the product melts at about 90–92°.

c. N-(1-adamantyl)-N-ethylethylenediamine

To a solution of 3.76 g. of N-[2-[N'-(1-adamantyl)-N'-ethylamino]ethyl]-p-toluenesulfonamide in a mixture of 25 ml. of ether and 75 ml. of tetrahydrofuran, 100 ml. of liquid ammonia are added under a dry ice condenser. Freshly cut sodium is added with stirring during 0.5 hour till a permanent blue color is obtained. After stirring the solution for 2 hours, 5 g. of solid ammonium chloride are added and the excess ammonia is allowed to evaporate. The solid is filtered and extracted thoroughly with ether. The combined ethereal extract is concentrated to give 2.1 g. of N-(1-adamantyl)-N-ethylethylenediamine as a thick oily liquid.

The salt with one mole of p-aminobenzoic acid crystallizes from acetonitrile as white needles: m.p. about 159–160°.

d. N-[2-[N'-(1-adamantyl)-N'-ethylamino]ethyl]-p-nitrobenzamide hydrochloride

To a solution of 1.11 g. of N-(1-adamantyl)-N-ethylethylenediamine in 50 ml. of dry chloroform, a solution of 0.93 g. of p-nitrobenzoyl chloride in 25 ml. of dry chloroform is added dropwise at room temperature, and the mixture is refluxed for 4 hours. Evaporation of the chloroform gives a solid, which crystallizes on the addition of ether yielding 1.6 g. of N-[2-[N'-(1-adamantyl)-N-ethylamino]ethyl]-p-nitrobenzamide as brownish-white crystals, melting at about 191–193° after crystallization from acetonitrile.

e. N-[2-[N'-(1-adamantyl)-N'-ethylamino]ethyl]-p-aminobenzamide hydrochloride

A solution of 1.2 g. of N-[2-[(1-adamantyl)-N'-ethylamino]ethyl]-p-nitrobenzamide hydrochloride in 50 ml. of alcohol is reduced in a Parr hydrogenator using 0.12 g. of platinum oxide as catalyst. Evaporation of the solvent, after filtering off the catalyst gives a solid which is crystallized from acetonitrile to yield 0.78 g. of the product as pink-white crystals melting at about 280–282°.

By replacing the 1-acetamidoadamantane with 2-acetamidoadamantane as the starting material in part (a) above and proceeding through steps (b) to (e), inclusive, N-[2-[N'-(2-adamantyl)-N'-ethylamino]ethyl]-p-aminobenzamide hydrochloride is obtained.

By replacing the p-nitrobenzoyl chloride in part (c) with the acid chlorides derived from the following substituted 4-nitrobenzoic acids, respectively, the corresponding N-[2-[N'-(1-adamantyl)-N'-ethylamino]ethyl]-p-amino-R¹-benzamide, hydrochloride, is obtained.

| R¹-substituted-4-nitrobenzoic acid | R¹-substituted benzamide |
|---|---|
| 2-chloro | 2-chloro |
| 3-chloro | 3-chloro |
| 2-bromo | 2-bromo |
| 3-bromo | 3-bromo |

| R¹-substituted-4-nitrobenzoic acid | R¹-substituted benzamide |
|---|---|
| 2-fluoro | 2-fluoro |
| 2-methoxy | 2-methoxy |
| 2-ethoxy | 2-ethoxy |
| 3-ethoxy | 3-ethoxy |
| 2-propoxy | 2-propoxy |
| 2-methyl | 2-methyl |
| 2-trifluoromethyl | 2-trifluoromethyl |

By replacing the N-ethyl-1-adamantylamine with the following amines, the corresponding N-[2-[N'-(1-adamantyl)-R³-amino]ethyl]-p-aminobenzamide are obtained.

| Amine | R³ substituent |
|---|---|
| 1-(butylamino)adamantane | butyl |
| 1-(isopropylamino)adamantane | isopropyl |
| 1-(benzylamino)adamantane | benzyl |
| 1-(2-phenethylamino)adamantane | 2-phenylethyl |
| 1-(allylamino)adamantane | allyl |
| 1-(n-propylamino)adamantane | n-propyl |
| 1-(methylamino)adamantane | methyl |
| 1-(pentylamino)adamantane | pentyl |
| [U.S. Pat. No. 3,310,469, supra] | |

EXAMPLE 2

N-[2-[N'-3-methyl-1-adamantyl)-N'-ethylamino]ethyl]-p-aminobenzamide, hydrochloride a. 1-Ethylamino-3-methyladamantane A mixture of 60 g. of N-ethylacetamide, 45 g. of 1-bromo-3-methyladamantane [Fort et al. supra, p. 288] and 60 g. of silver sulfate is heated at 100° for 1 hour. The cooled mixture is treated with 100 ml. of water and extracted with ether. The ether extracts are combined, dried over anhydrous magnesium sulfate and concentrated under reduced pressure to yield 1-(N-ethylacetamido)-3-methyladamantane.

A mixture of 12 g. of 1-(N-ethylacetamido)-3-methyladamantane, 12 g. of sodium hydroxide and 120 ml. of diethylene glycol is refluxed for 5 hours. The cooled mixture is poured into 1 liter of water and extracted with ether. The combined ether extracts are dried over anhydrous potassium carbonate and the ether then removed by distillation to yield the 1-ethylamino-3-methyladamantane.

b. N-[2-[N'-(3-methyl-1-adamantyl)-N'-ethylamino]ethyl]-p-aminobenzamide, hydrochloride Following the procedure of Example 1 but substituting 1-ethylamino-3-methyladamantane for an equivalent amount of N-ethyl-1-adamantylamine, there is obtained the desired N-[2-[N'-(3-methyl-1-adamantyl)-N'-ethylamino]ethyl]-p-aminobenzamide, hydrochloride.

EXAMPLE 3

N-[2-[N'-(3-methoxy-1-adamantylmethyl)-N'-methylamino]ethyl]-p-aminobenzamide, hydrochloride a. N-methyl-3-methoxy-1-adamantanecarboxamide A mixture of 10 grams of 3-methoxy-1-adamantanecarboxylic acid [Fort et al., supra, p. 289] and 20 ml. of thionyl chloride are heated under reflux for 30 minutes. The excess thionyl chloride is removed by distillation under reduced pressure, 10 ml. of anhydrous benzene is added and the benzene removed by distillation under reduced pressure. The cooled residue is treated with a solution of methylamine in benzene. After several hours the precipitated solid is removed by filtration, and the filtrate concentrated under reduced pressure to yield N-methyl-3-methoxy-1-adamantanecarboxamide.

b. N-(3-methoxy-1-adamantylmethyl)methylamine

A solution of 10 g. of N-methyl-3-methoxy-1-adamantanecarboxamide in anhydrous ether is added slowly to a suspension of lithium aluminum hydride in anhydrous ether. After the addition is completed, the reaction mixture is heated to gentle reflux for four hours and is then cooled. Water is added dropwise to decompose the unreacted lithium aluminum hydride, followed by a 10 percent sodium hydroxide solution. The precipitated solids are removed by filtration and washed with ether. The combined ether solutions are dried over anhydrous magnesium sulfate and concentrated under reduced pressure to yield the N-(3-methoxy-1-adamantylmethyl)methylamine.

c. N-[2-[N'-(3-methoxy-1-adamantylmethyl)-N'-methylamino]ethyl]-p-aminobenzamide, hydrochloride Following the procedure of Example 1, but substituting N-(3-methoxy-1-adamantylmethyl)methylamine for an equivalent amount of N-ethyl-1-adamantylamine, there is obtained the desired N-[2-[N'-(3-methoxy-1-adamantylmethyl)-N'-methylamino]ethyl]-p-aminobenzamide, hydrochloride.

By replacing the 3-methoxy-1-adamantanecarboxylic acid in part (a) with the following acids, the corresponding N-[2-[N'-(R-substituted-1-adamantylmethyl)-N'-methylamino]ethyl]-p-aminobenzamide hydrochloride are obtained.

| Acid | R-substituted adamantylmethyl methylamino dervatives |
|---|---|
| 3-methyl-1-adamantanecarboxylic acid | 3-methyl |
| 3-fluoro-1-adamantanecarboxylic acid | 3-fluoro |
| 3-chloro-1-adamantanecarboxylic acid | 3-chloro |
| 3-bromo-1-adamantanecarboxylic acid | 3-bromo |
| 3-iodo-1-adamantanecarboxylic acid | 3-iodo |
| 3,5-dimethyl-1-adamantanecarboxylic acid | 3,5-dimethyl |
| [Fort et al., supra, pp. 288-289] | |

EXAMPLE 4

N-[2-[N'-(1-adamantyl)-N-methylamino]ethyl]-N-methyl-p-aminobenzamide hydrochloride a. 2-(N-methyl-1-adamantylamino)ethanol A 140 ml. stainless steel bomb is charged with 16.5 g. of N-methyl-1-adamantylamine [U.S. Pat. No. 3,310,469, Eire Pat. No. supra], 5.0 g. of ethylene oxide and 50 ml. of aqueous tetrahydrofuran and heated at 70° for 12 hours. The solvent is removed by distillation and the residue is fractionally distilled to yield the desired 2-(N-methyl-1-adamantylamino)ethanol.

b. N-(2-chloroethyl)-N-methyl-1-adamantylamine hydrochloride

To a solution of 127 grams of 2-(N-methyl-1-adamantylamino) ethanol in 300 ml. of chloroform there is added dropwise, with vigorous stirring, 90 ml. of thionyl chloride, while the temperature of the reaction mixture is maintained at 20–25°. The mixture is then refluxed for 2 hours and a portion of the solvent is removed by distillation. The residue is cooled and diluted with anhydrous ether to give, as a colorless crystalline solid, N-(2-chloroethyl)-N-methyl-1-adamantylamine hydrochloride.

c. N,N'-dimethyl-N-(1-adamantyl)ethylenediamine

To 300 g. of a cold 40 percent aqueous monomethylamine solution there is added 160 g. of N-(2-chloroethyl)-N-methyl-1-adamantylamine hydrochloride and 100 ml. of ethanol. The reaction mixture is stirred 1 hour at room temperature and then four hours at 80°. The reaction mixture is cooled and 100 g. of solid sodium hydroxide added. The temperature is kept below 30° during this addition by external cooling. The mixture is then extracted with ether, and the combined ether extracts dried over anhydrous potassium carbonate. The ether is then removed by distillation and the residue fractionally distilled to yield the desired N,N'-dimethyl-N-(1-adamantyl)ethylenediamine.

d) N-[2-[N'-(1-adamantyl)-N'-methylamino]ethyl]-N-methyl-p-aminobenzamide, hydrochloride Following the procedure of Example 1, but substituting N,N'-dimethyl-N-(1-adamantyl)ethylenediamine for an equivalent amount of N-(1-adamantyl)-N-ethylethylenediamine there is obtained the desired N-[2-[(1-adamantyl)methylamino]ethyl]-N-methyl-p-aminobenzamide, hydrochloride.

EXAMPLE 5

N-[3-[N'-(1-adamantyl)-N'-methylamino]propyl]-N-methyl-p-aminobenzamide hydrochloride a. N-(1-adamantyl)-3-chloro-N-methylpropionamide With ice-cooling and stirring, 37.1 g. of β-chloropropionyl chloride in 100 ml. of anhydrous benzene is added dropwise to 100 g. of 1-(methylamino)adamantane [U.S. Pat. No. 3,310,469, supra.] in 200 ml. of anhydrous benzene. The reaction mixture is then refluxed for 5 hours, filtered and the filtrate washed with water and dried over anhydrous magnesium sulfate. The ether is removed by distillation and the N-(1-adamantyl)-3-chloro-N-methylpropionamide thus obtained may be used without further purification. If desired, the product may be purified by fractional distillation.

b. N-(3-chloropropyl)-N-methyl-1-adamantylamine

To 3.8 g. of lithium aluminum hydride in 200 ml. of anhydrous ether is added dropwise a solution of 25 g. of N-(1-adamantyl)-3-chloro-N-methylpropionamide in 400 ml. of anhydrous ether. The mixture is then refluxed for 1 hour, cooled in ice, treated with 2.5 ml. of water and then 2.5 ml. of 20 percent aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantylamine.

c. N-[3-[N'-(1-adamantyl)-N'-methylamino]propyl]-N-methyl-p-aminobenzamide, hydrochloride Following the procedure of Example 4, but substituting N-(3-chloropropyl)-N-methyl-1-adamantylamine for an equivalent amount of N-(2-chloroethyl)-N-methyl-1-adamantylamine hydrochloride there is obtained the desired N-[3-[N'-(1-adamantyl)-N'-methylamino]-propyl]-N-methyl-p-aminobenzamide hydrochloride.

EXAMPLE 6

N-[2-[N'-(1-adamantyl)-N'-ethylamino]ethyl]-N-allyl-p-aminobenzamide hydrochloride a. N-[2-[N'-(1-adamantyl)-N'-ethylamino]ethyl]-N-allyl-p-toluene sulfonamide To a solution of N-[2-[N'-(1-adamantyl)-N'-ethylamino]-ethyl]-p-toluene sulfonamide in dilute aqueous sodium hydroxide there is added dropwise with vigorous stirring an equivalent of allyl bromide. The reaction mixture is stirred at room temperature for six hours and the mixture extracted with chloroform. The chloroform extract is washed with dilute aqueous sodium hydroxide, then with water and is dried over anhydrous magnesium sulfate. The chloroform solution is then concentrated under reduced pressure to yield as the residue N-[2-[N'-(1-adamantyl)-N'-ethylamino]-ethyl]-N-allyl-p-toluene sulfonamide.

b. N-[2-[N'-(1-adamantyl)-N'-ethylamino]ethyl]-N-allyl-p-toluene sulfonamide

Following the procedure of Example 1 but substituting N-[2-[N'-(1-adamantyl)-N'-ethylamino]ethyl]-N-allyl-p-toluene sulfonamide for an equivalent amount of N-[2-[N'-(1-adamantyl)-N'-ethylamino]ethyl]-p-toluenesulfonamide, there is obtained the desired N-[2-[N'-(1-adamantyl)-N'-ethylamino]ethyl]-N-allyl-p-aminobenzamide hydrochloride.

EXAMPLE 7

N-[[2-N'-[2-(1-adamantyl)-N'-ethyl]methylamino]ethyl]-p-aminobenzamide hydrochloride Following the procedure of Example 3 but substituting 1-adamantylacetic acid [Stetter, Chem. Ber. 92, 1631, (1959)] for an equivalent amount of 3-methoxy-1-adamantanecarboxylic acid there is obtained the desired N-[[2-N'[2-(1-adamantyl)ethyl]-N'-methylamino]-ethyl]-p-aminobenzamide, hydrochloride.

By substituting for the starting material having the amino substituent on the adamatane ring in the 1-position the corresponding adamantane derivative with the amino substituent in the 2-position, the corresponding product with the nitrogen containing side chain in the 2-position is obtained in each instance.

What is claimed is:

1. A member of the group consisting of a base of the formula

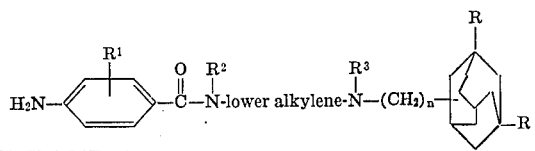

wherein each R is hydrogen when the adamantyl ring is attached to the side chain at other than the bridgehead position and each R is hydrogen, halo or lower alkyl when the adamantyl ring is attached to the side chain at the bridgehead position, $R^1$ is hydrogen, halo, trifluoromethyl, lower alkoxy or lower alkyl, $R^2$ and $R^3$ each is hydrogen, lower alkyl, lower alkenyl or phenyl-lower alkyl and $n$ is 0 to 2, and physiologically acceptable acid addition salts of said bases.

2. A base as in claim 1 wherein each R is lower alkyl, $R^1$, $R^2$ and $R^3$ each is hydrogen and $n$ is 1.

3. A base as in claim 1 wherein one R is halo and the other R is hydrogen, $R^1$, $R^2$ and $R^3$ each is hydrogen and $n$ is 1.

4. A base as in claim 1 wherein $R^3$ is lower alkyl, R, $R^1$ and $R^2$ each is hydrogen and $n$ is 0.

5. A base as in claim 1 wherein one R is hydrogen and one R is lower alkyl, $R^3$ is lower alkyl, $R^1$ and $R^2$ each is hydrogen and $n$ is 0.

6. A 2-adamantyl base as in claim 1 wherein R, $R^1$, $R^2$ and $R^3$ each is hydrogen and $n$ is 1.

7. A 1-adamantyl base as in claim 1 wherein the lower alkylene group has three carbon atoms, $R^3$ is methyl, R, $R^1$ and $R^2$ each is hydrogen and $n$ is 0.

8. A 1-adamantyl base as in claim 1 wherein the lower alkylene group has two carbon atoms, $R^3$ is ethyl, R, $R^1$ and $R^2$ each is hydrogen and $n$ is 0.

9. A 1-adamantyl base as in claim 1 wherein the lower alkylene group has two carbon atoms, $R^3$ is methyl, R, $R^1$ and $R^2$ each is hydrogen and $n$ is 2.

10. A 1-adamantyl base as in claim 1 wherein the lower alkylene group has two carbon atoms, $R^1$ and $R^3$ each is methyl, R and $R^2$ each is hydrogen and $n$ is 0.

11. A member of the group consisting of a base of the formula

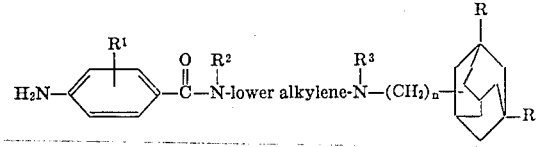

wherein each R is hydrogen, halo or lower alkyl, $R^1$ is hydrogen, halo, trifluoromethyl, lower alkoxy or lower alkyl, $R^2$ and $R^3$ each is hydrogen, lower alkyl, lower alkenyl or phenyl-lower alkyl and $n$ is 0 to 2, and physiologically acceptable acid addition salts of said bases.

12. A base of the formula

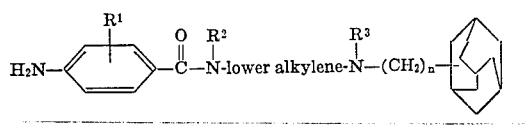

wherein $R^1$ is hydrogen, halo, trifluoromethyl, lower alkoxy or lower alkyl, $R^2$ and $R^3$ are each hydrogen, lower alkyl, lower alkenyl or phenyl-lower alkyl and $n$ is 0 to 2.

13. A base as in claim 1 wherein each R is hydrogen.

* * * * *